United States Patent [19]

Ando et al.

[11] Patent Number: 4,655,509

[45] Date of Patent: Apr. 7, 1987

[54] HYDRAULIC ANTI-SKID APPARATUS FOR AUTOMOTIVE VEHICLES

[75] Inventors: Masamoto Ando; Hiroaki Takeuchi, both of Toyota; Toyohisa Yamada, Anjo; Toshihiko Yamanaka, Toyota; Nobuyasu Nakanishi, Toyota; Noboru Noguchi, Toyota, all of Japan

[73] Assignees: Aisin Seiki Kabushiki Kaisha, Kariya; Yoyota Jidosha Kabushiki Kaisha, Toyota, both of Japan

[21] Appl. No.: 873,849

[22] Filed: Jun. 11, 1986

Related U.S. Application Data

[63] Continuation of Ser. No. 781,631, Sep. 30, 1985, abandoned.

[30] Foreign Application Priority Data

Sep. 29, 1984 [JP] Japan .................... 59-204790
Mar. 11, 1985 [JP] Japan .................... 60-048534

[51] Int. Cl.⁴ .................... B60T 8/02; B60T 8/88; B60T 13/16
[52] U.S. Cl. .................... 303/10; 303/6 R; 303/92; 303/115; 303/116; 303/119
[58] Field of Search ............ 303/6 R, 6 A, 10-12, 303/92, 119, 115, 116, 113, 100, 114, 117, 61-63, 68-69; 188/181; 60/547.1, 545, 591, 581, 582, 579

[56] References Cited

U.S. PATENT DOCUMENTS

| | | | |
|---|---|---|---|
| 3,836,208 | 9/1974 | Wienecke | 303/6 R X |
| 3,905,654 | 9/1975 | Tribe | 303/10 X |
| 4,027,924 | 6/1977 | Kondo | 303/92 |
| 4,050,748 | 9/1977 | Belart | 303/115 X |
| 4,492,414 | 1/1985 | Kozakai et al. | 303/116 |
| 4,515,412 | 5/1985 | Sato | 303/6 R |
| 4,561,701 | 12/1985 | Fujii et al. | 303/119 |

Primary Examiner—Douglas C. Butler
Attorney, Agent, or Firm—Oblon, Fisher, Spivak, McClelland & Maier

[57] ABSTRACT

A hydraulic anti-skid apparatus which includes a cut-off valve disposed within a braking circuit connecting a master cylinder to a wheel brake cylinder, a bypass valve disposed within a bypass passage of the braking circuit, first and second pistons respectively arranged to control opening and closing operations of the cut-off valve and the bypass valve, the first and second pistons each being arranged to be applied at one end thereof with a hydraulic braking pressure from the master cylinder and at the other end thereof with a hydraulic power pressure from a fluid pump, a solenoid valve arranged to apply the power pressure to the first piston in its deactivated condition and to connect the first piston to a fluid reservoir in its activated condition, and a regulator valve arranged to control the power pressure applied to the first and second pistons in accordance with the braking pressure applied thereto. The regulator valve is arranged acts to cooperate with a check valve in response to the braking pressure thereby to produce a hydraulic pressure at a higher value than the braking pressure. An orifice element is further arranged to throttle the flow of pressurized fluid supplied to the first piston through the regulator and solenoid valves to maintain the power pressure acting on the second piston.

13 Claims, 7 Drawing Figures

HYDRAULIC ANTI-SKID APPARATUS FOR AUTOMOTIVE VEHICLES This application is a continuation of application Ser. No. 781,631, filed Sept. 30, 1985, now abandoned.

BACKGROUND OF THE INVENTION

1. Field of the Invention

The present invention relates to a hydraulic anti-skid apparatus for installation in a vehicle braking system between a master cylinder and wheel brake cylinders to prevent the road wheels of the vehicle from locking in braking operation.

2. Discussion of the Background

As one of such anti-skid apparatus as described above, there has been proposed an anti-skid apparatus which comprises a cut-off valve disposed within a braking circuit connecting a master cylinder to a wheel brake cylinder, a bypass valve disposed within a bypass passage of the braking circuit, first and second pistons respectively arranged to control opening and closing operations of the cut-off valve and the bypass valve, the first and second piston each being arranged to be applied at one end thereof with a hydraulic braking pressure from the master cylinder and at the other end thereof with a hydraulic power pressure from a fluid pump, a solenoid valve arranged to be activated when a road wheel of the vehicle tends to be locked in braking operation, the solenoid valve being adapted to apply the hydraulic power pressure to the first piston in its deenergized condition and to connect the first piston to a fluid reservoir in its energized condition, and a regulator valve arranged to control the hydraulic power pressure applied to the first and second pistons in accordance with the hydraulic braking pressure applied thereto from the master cylinder.

In the above-described conventional anti-skid apparatus, the fluid pump is in the form of a fluid pump of large capacity which is driven by a prime mover of the vehicle to apply a hydraulic power pressure to a power-assisted steering apparatus. For this reason, in the case where the anti-skid apparatus is adapted to an automotive vehicle without provision of such a power-assisted steering apparatus, the power of the prime mover is always consumed for operation of the fluid pump during travel of the vehicle. In such a case, it is desirable that the fluid pump is replaced with a fluid pump of small capacity arranged to be driven by an electric motor only when the vehicle is braked. However, if the master cylinder is actuated prior to activation of the fluid pump in the conventional anti-skid apparatus, the first and second pistons are displaced from their initial positions by the hydraulic braking pressure to cause abnormal operations of the cut-off valve and the bypass valve. Furthermore, in the conventional anti-skid apparatus, the first piston is moved backward from the initial position by the hydraulic braking pressure when connected to the fluid reservoir in response to energization of the solenoid valve, and subsequently the first piston is rapidly supplied with pressurized fluid from the regulator valve in response to deenergization of the solenoid valve. During such movement of the first piston, the hydraulic power pressure in the regulator valve is instantaneously decreased, and in turn, the regulator valve is supplied with pressurized fluid from the master cylinder. This causes pressure pulsation in the regulator valve and the master cylinder, resulting in unpleasant shocks on the brake pedal. If in such a situation, the second piston is displaced by the hydraulic braking pressure due to decrease of the hydraulic power pressure, there will occur leakage of the braking fluid across the bypass valve. As a result, the first piston may not be moved to the initial position due to the braking pressure applied thereto across the bypass valve.

SUMMARY OF THE INVENTION

It is, therefore, a primary object of the present invention to provide an improved hydraulic anti-skid apparatus wherein a fluid pump of small capacity driven by an electric motor can be adapted to produce the hydraulic power pressure acting on the first and second pistons without causing the problems described above.

Another object of the present invention is to provide an improved hydraulic anti-skid apparatus wherein the regulator valve acts to produce a hydraulic power pressure when applied with the hydraulic braking pressure from the master cylinder prior to activation of the fluid pump thereby to maintain the first and second pistons in their initial positions.

A further object of the present invention is to provide an improved hydraulic anti-skid apparatus, having the above-described characteristics, capable of restraining a decrease of the hydraulic power pressure caused by movement of the first piston.

According to the present invention, the foregoing objects are accomplished by providing a hydraulic anti-skid apparatus wherein the regulator valve comprises a booster piston assembly having a small diameter portion applied with the hydraulic power pressure from the fluid pump and a large diameter portion applied with the hydraulic braking pressure from the master cylinder, and an exhaust valve assembled with the booster piston assembly to connect the small diameter portion of the booster piston assembly to the fluid reservoir when the hydraulic power pressure exceeds a predetermined valve higher than the hydraulic braking pressure, and wherein a check valve is arranged between the fluid pump and the regulator valve to permit the flow of pressurized fluid supplied from the fluid pump to the regulator valve and to block the flow of pressurized fluid from the regulator valve to the fluid pump so that the booster piston assembly of the regulator valve cooperates with the check valve to produce a hydraulic pressure at a higher value than the braking pressure. In the hydraulic anti-skid apparatus, flow restriction means is arranged to throttle the flow of pressurized fluid supplied to the first piston through the regulator valve and the solenoid valve so as to maintain the hydraulic power pressure acting on the second piston.

In the actual practices of the present invention, it is preferable that the flow restriction means includes a first orifice element arranged between the fluid pump and the regulator valve to throttle the flow of pressurized fluid supplied to the booster piston assembly of the regulator valve, and a second orifice element assembled with the solenoid valve to throttle the flow of pressurized fluid supplied to the first piston through the solenoid valve. Alternatively, the flow restriction means may include a first orifice element disposed within a hydraulic circuit between the regulator valve and the solenoid valve to throttle the flow of pressurized fluid supplied to the solenoid valve from the regulator valve and a second orifice element assembled with the solenoid valve to throttle the flow of pressurized fluid supplied to the first piston through the solenoid valve.

BRIEF DESCRIPTION OF THE DRAWINGS

Additional object, features and advantages of the present invention will become more readily apparent from the following detailed description of preferred embodiments thereof when taken together with the accompanying drawings, in which.

DESCRIPTION OF THE PREFERRED EMBODIMENT

Figure 1:
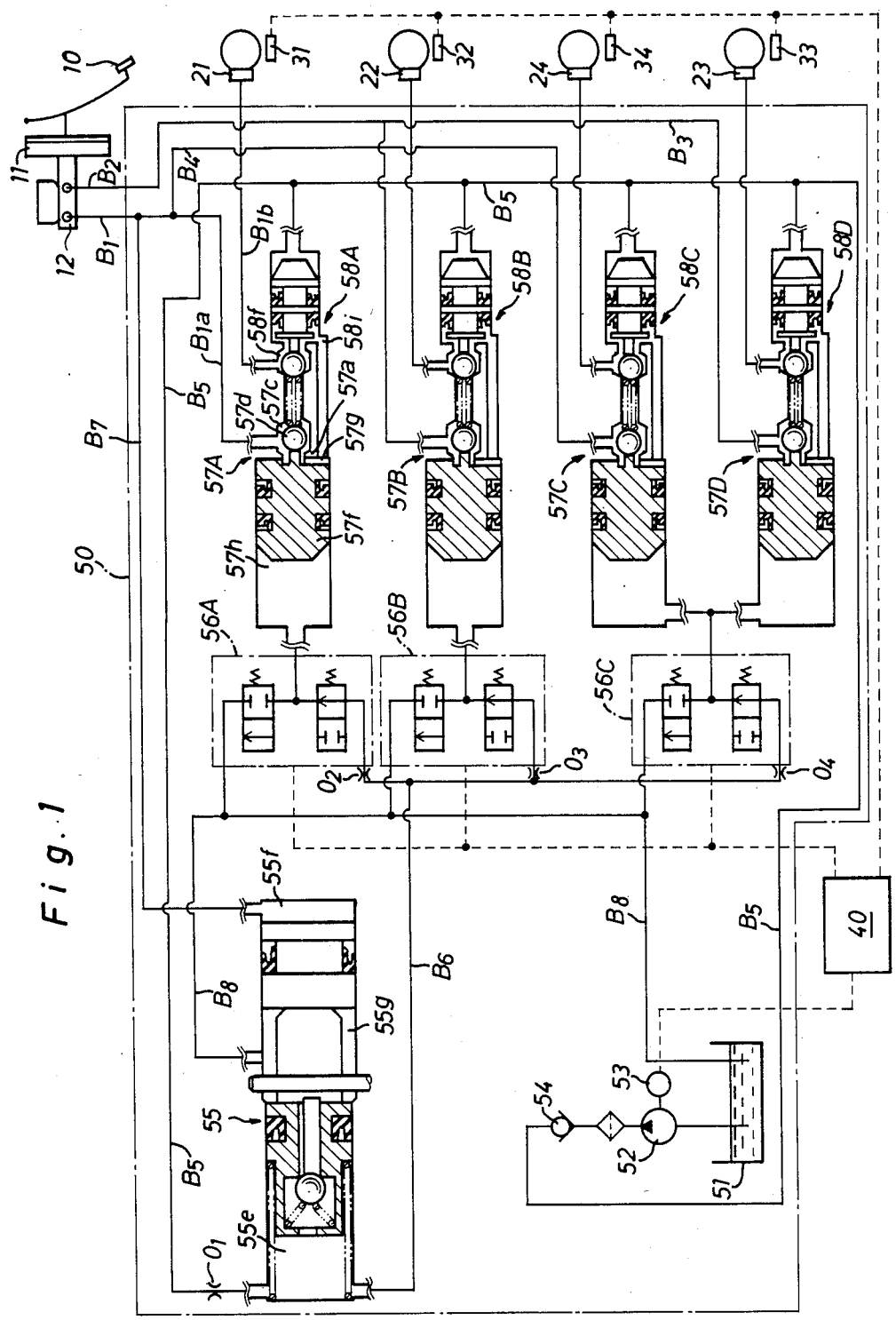
FIG. 1 is a schematic illustration of a hydraulic anti-skid apparatus in accordance with the present invention.

Referring now to the drawings, particularly in FIG. 1, there is schematically illustrated a braking system for automotive vehicles which includes a tandem master cylinder 12 equipped with a booster 11 to be activated by depression of a brake pedal 10. The tandem master cylinder 12 has a front pressure chamber connected to a left-hand front wheel brake cylinder 21 by way of a hydraulic circuit $B_1$ and connected to a right-hand rear wheel brake cylinder 24 by way of a bypass circuit $B_4$ of the hydraulic circuit $B_1$. The tandem master cylinder 12 has a rear pressure chamber connected to a right-hand front wheel brake cylinder 22 by way of a hydraulic circuit $B_2$ and connected to a left-hand rear wheel brake cylinder 23 by way of a bypass circuit $B_3$ of the hydraulic circuit $B_2$. Disposed within the hydraulic circuits $B_3$ and $B_4$ is a well known proportioning valve (not shown), respectively.

Figure 2:
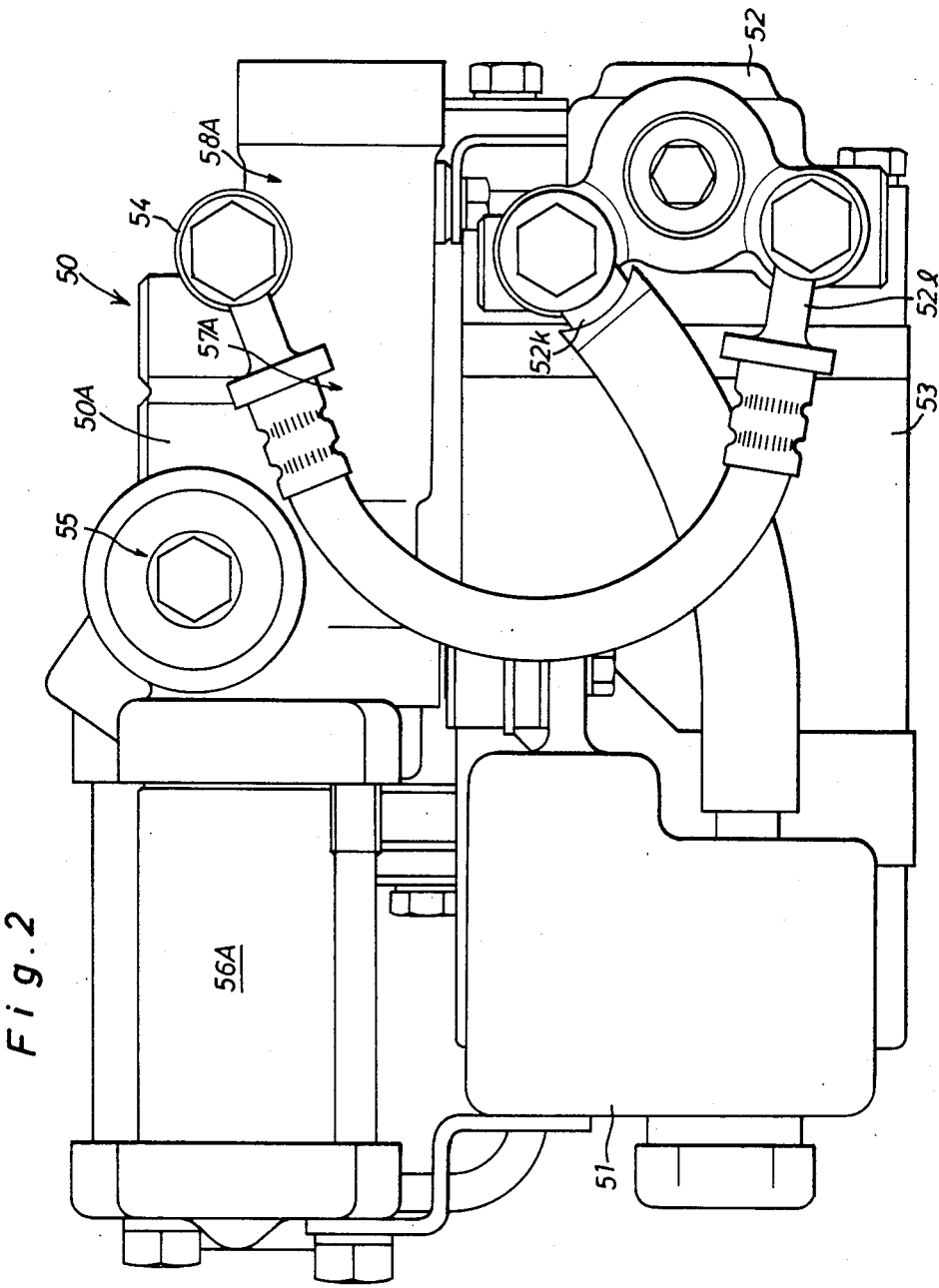
FIG. 2 is a front view of a housing body of the hydraulic anti-skid apparatus shown in FIG. 1.
Figure 3:
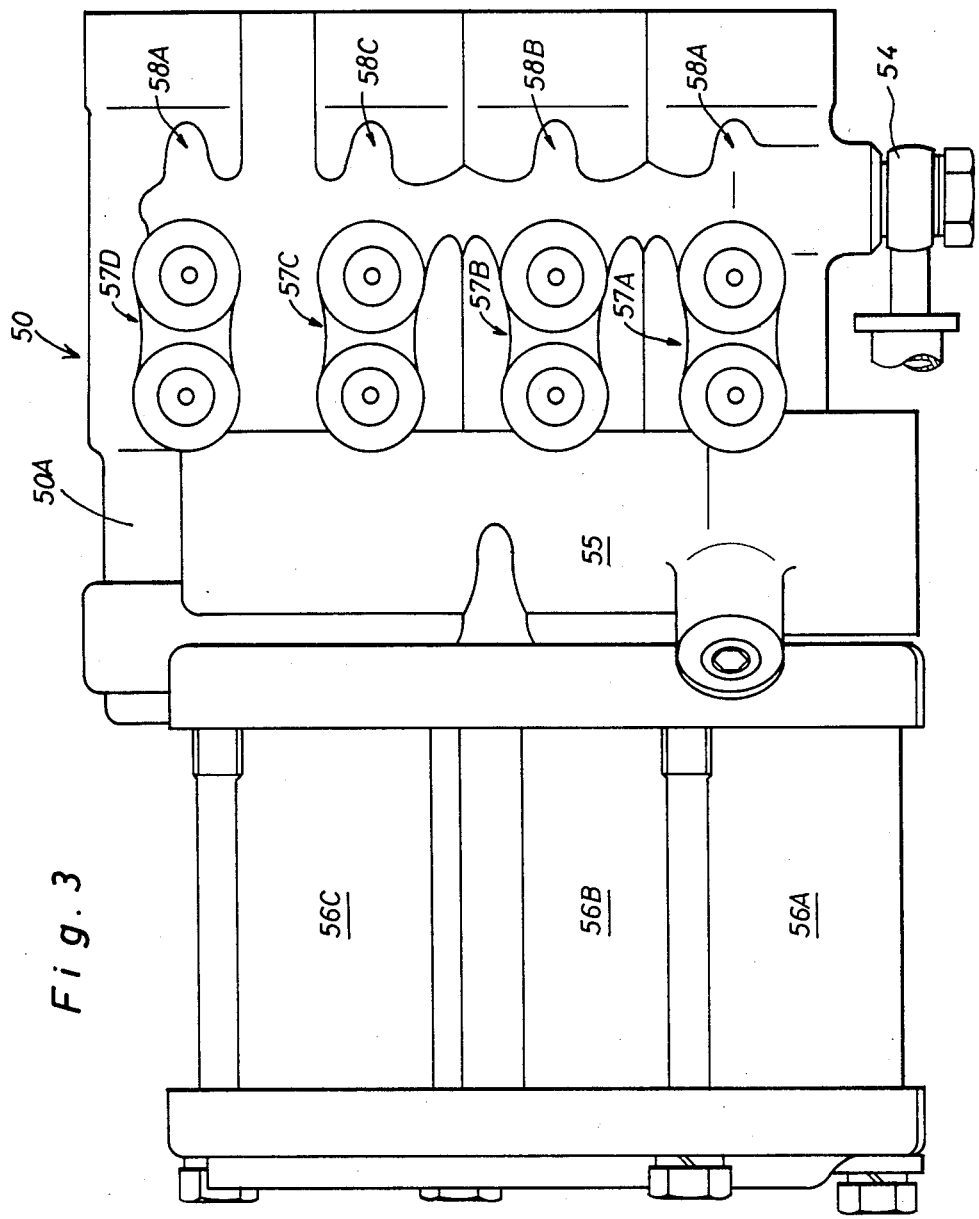
FIG. 3 is a plan view of the housing body shown in FIG. 2.

In the above-described arrangement of the hydraulic circuits, the braking system includes an anti-skid apparatus 50 for independently controlling the braking pressures applied to the wheel brake cylinders 21, 22, 23 and 24. The anti-skid apparatus 50 comprises wheel lock sensors 31, 32, 33 and 34 for detecting the rotational speed of the respective road wheels, and a computer 40 for producing an electric control signal therefrom dependent upon each valve of electric signals from the wheel lock sensors. The anti-skid apparatus 50 further comprises a fluid reservoir 51, a high pressure two-stage pump 52, an electric motor 53, a check valve 54, a regulator valve 55, solenoid valves 56A-56C, cut-off valves 57A-57D of the piston type, and bypass valves 58A-58D which are assembled within a common housing body 50A as shown in FIGS. 2 and 3.

Figure 4:
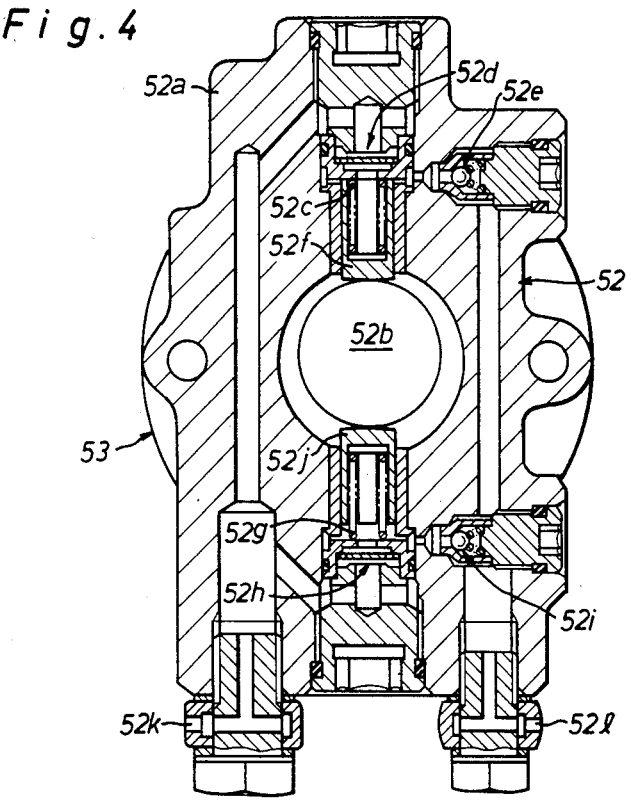
FIG. 4 is an enlarged sectional view of a fluid pump shown in FIGS. 1 and 2.

The fluid reservoir 51 is arranged to store a predetermined amount of hydraulic fluid to be supplied to the bypass valves 58A-58D and the regulator valve 55 by way of a hydraulic circuit $B_5$ and to the solenoid valves 56A-56C by way of a hydraulic circuit $B_6$ extended from the hydraulic circuit $B_5$. The high pressure two-stage pump 52 is arranged to be driven by the electric motor 53 for producing hydraulic power pressure. The check valve 54 is disposed within the hydraulic circuit $B_5$ to permit the flow of fluid under pressure supplied from the two-stage pump 52 to the bypass valves 58A-58D, regulator valve 55, and solenoid valves 56A-56C. As shown in FIG. 4, the high pressure two-stage pump 52 comprises a pump housing 52a integral with the housing body 50A, a cam shaft 52b rotatably mounted within the pump housing 52a to be driven by the electric motor 53, a plunger 52f arranged to be reciprocated by engagement with the cam shaft 52b under load of a spring 52c, and a pair of check valves 52d and 52e arranged to cooperate with the plunger 52f for operating it as a low pressure pump. The two-stage pump 52 further comprises a plunger 52j arranged to be reciprocated by engagement with the cam shaft 52b under the load of a spring 52g, and a pair of check valves 52h and 52i arranged to cooperate with the plunger 52j for operating it as a high pressure pump. The pump housing 52a is provided with an inlet port 52k in connection to the fluid reservoir 51, and an outlet port 52l in connection to the hydraulic circuit $B_5$.

Figure 5:
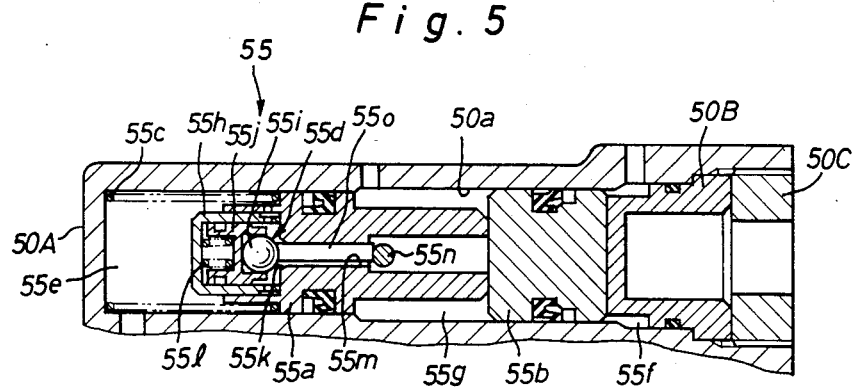
FIG. 5 is an enlarged sectional view of a regulator valve shown in FIGS. 1-3.

The regulator valve 55 is disposed between the hydraulic circuits $B_5$ and $B_6$. As shown in FIG. 5, the regulator valve 55 comprises a booster piston assembly including small and large diameter pistons 55a and 55b axially slidably disposed within a cylinder bore 50a in a portion of the housing body 50A and loaded by a spring 55c rightward, an exhaust valve assembly 55d, and a closure plug 50B disposed within an opening end of the cylinder bore 50a and fixed in place by a fastening nut 50C. The booster piston assembly is adapted to subdivide the interior of cylinder bore 50a into a power pressure chamber 55e and a braking pressure chamber 55f. The power pressure chamber 55e is formed at the left side of small diameter piston 55a and is communicated with the bypass valves 58A-58D and check valve 54 through the hydraulic circuit $B_5$ and with the solenoid valves 56A-56C through the hydraulic circuit $B_6$. The braking pressure chamber 55f is formed at the right side of large diameter piston 55b and is communicated with the front pressure chamber of master cylinder 12 through a bypass circuit $B_7$ of the hydraulic circuit $B_1$. Formed between the small and large diameter pistons 55a and 55b is a drain chamber 55g which is communicated with the fluid reservoir 51 through an exhaust circuit $B_8$. (see FIG. 1) In such arrangement of the regulator valve 55, an orifice element $O_1$ is disposed within the hydraulic circuit $B_5$ between the bypass valves 58A-58D and the power pressure chamber 55e of regulator valve 55.

The exhaust valve assembly 55d includes a retainer casing 55h fixed to the left end of small diameter piston 55a, a holder 55j axially slidably disposed within the retainer casing 55h and loaded by a spring 55l toward the drain chamber 55g, a ball valve 55i received by the holder 55j to cooperate with a valve seat 55k formed at the left end of small diameter piston, and a rod 55o axially slidably disposed within a through hole 55m in piston 55a. In such arrangement of the exhaust valve assembly 55d, the interior of retainer casing 55h is communicated with the power pressure chamber 55e through radial openings formed in the peripheral wall of retainer casing 55h and the left end of piston 55a, and the rod 55o is chamfered at one side thereof to form a communication passage between the interior of retainer casing 55h and the drain chamber 55g. The rod 55o is engaged at its one end with the ball valve 55i and at its other end with a lateral pin 55n fixed to the housing body 50A. Thus, the rod 55o acts to separate the ball valve 55*i* from the valve seat 55*k* against the load of spring 55*l*.

In operation of the regulator valve 55, the power pressure chamber 55*e* is applied with a hydraulic power pressure through the check valve 54 and orifice element $O_1$ during activation of the two-stage pump 52, while the braking pressure chamber 55*f* is applied with a hydraulic braking pressure from the master cylinder 12 through the hyraulic circuit $B_7$ in response to depression of the brake pedal 10. When the brake pedal 10 is depressed during deactivation of the two-stage pump 52, the booster piston assembly is moved against the load of spring 55*c* by the hydraulic braking pressure applied to the braking pressure chamber 55*f*. Thus, the regulator valve 55 acts to cooperate with the check valve 54 in response to leftward movement of the booster piston assembly thereby to produce a hydraulic pressure in power pressure chamber 55*e* at a higher value than the braking pressure. When the two-stage motor 52 is activated during depression of the brake pedal 10, the booster piston assembly is moved in accordance with the difference in pressure between pressure chambers 55*e* and 55*f*. When the pressure in chamber 55*e* is increased to a valve higher than the pressure in chamber 55*f*, the exhaust valve assembly 55*d* acts to permit the flow of fluid from the power pressure chamber 55*e* to the drain chamber 55*g*. Thus, the regulator valve 55 acts to control the hydraulic power pressure in chamber 55*e* in accordance with the hydraulic braking pressure applied to chamber 55*f*.

Figure 6:
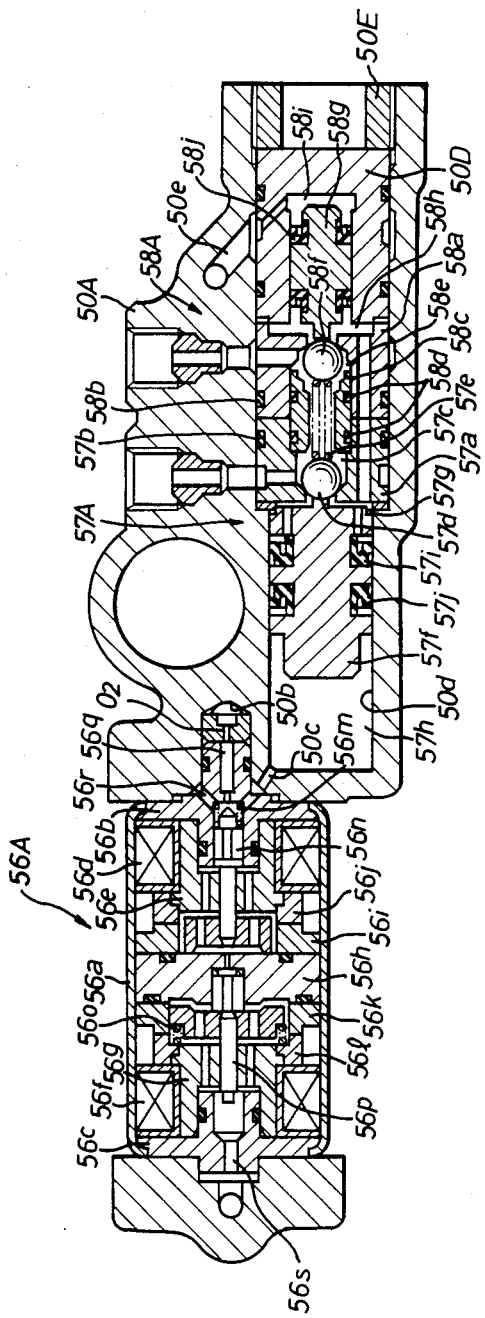
FIG. 6 is an enlarged sectional view of a solenoid valve, a cut-off valve and a bypass valve shown in FIGS. 1-3.

The solenoid valve 56A is energized in response to the electric control signal from the computer 40 to control the hydraulic power pressure applied to the cut-off valve 57A therethrough from the regulator valve 55. As shown in FIG. 6, the solenoid valve 56A comprises a cylindrical casing 56*a*, a pair of axially spaced stationary yokes 56*b* and 56*c* fixedly coupled with the opposite ends of casing 56*a*, a pair of axially spaced solenoid windings 56*d* and 56*f* wound around a pair of axially spaced bobbins, a pair of axially spaced stationary cores 56*e* and 56*g* respectively coupled with the bobbins, a valve plate 56*h* interposed between the solenoid windings 56*d* and 56*f* respectively through annular yoke members 56*i*, 56*j* and 56*k*, 56*l*, a movable valve core 56*n* slidably disposed within an axial bore in stationary core 56*e* and being loaded leftward by a compression spring 56*m* to be attracted rightward in energization of the solenoid winding 56*d*, and a movable valve core 56*p* slidably disposed within an axial hole in stationay core 56*g* and being loaded rightward by a compression spring 56*o* to be attracted leftward in energization of the solenoid winding 56*f*. The stationary yoke 56*b* is formed with an inlet port 56*q* and a radial port 56*r*, while the stationary yoke 56*c* is formed with an exhaust port 56*s* which is communicated with the fluid reservoir 51 through the exhaust circuit $B_8$. (see FIG. 1) The stationary yoke 56*b* of solenoid valve 56A is fluid-tightly coupled at its outer end within a bore 50*b* of the housing body 50A which is provided therein with an orifice element $O_2$ and communicated with the power pressure chamber 55*e* of regulator valve 55 through the hydraulic circuit $B_6$. (see FIG. 1) In such arrangement of solenoid valve 56A, the orifice element $O_2$ is replaceably positioned within the bore 50*b* and adapted to throttle the flow of pressurized fluid supplied into the power pressure chamber 57*h* of cut-off valve 57A from the power pressure chamber 55*e* of regulator valve 55 through the inlet port 56*q* and radial port 56*r* of solenoid valve 56A.

During deenergization of both the solenoid windings 56*d* and 56*f*, the movable valve core 56*n* is disengaged from a seat portion of stationary yoke 56*b* under the load of spring 56*m*, while the movable valve core 56*p* is maintained in engagement with a seat portion of valve plate 56*h* under the load of spring 56*o*. Under such a condition, the inlet port 56*q* of solenoid valve 56A is communicated with a passage 50*c* in the housing body 50A through the radial port 56*r* and blocked from the exhaust port 56*s*. When both the solenoid windings 56*d*, 56*f* are energized, the movable valve core 56*n* is attracted rightward against spring 56*m* to engage the seat portion of yoke 56*b*, while the movable valve core 56*p* is attracted leftward against spring 56*o* to disengage from the seat portion of valve plate 56*h*. Thus, the passage 50*c* is blocked from the inlet port 56*q* of solenoid valve 56A and is communicated with the exhaust port 56*s* through the radial port 56*r* and axial passages in stationary core 56*e*, valve plate 56*h* and stationary core 56*g*.

The solenoid valve 56B is arranged to be energized in response to the electric control signal from computer 40 for controlling the hydraulic power pressure applied to the cut-off valve 57B therethrough from the regulator valve 55, and the solenoid 56C is arranged to be energized in response to the electric control signal from computer 40 for controlling the hydraulic power pressure applied to the cut-off valves 57C and 57D therethrough from the regulator valve 55. As shown in FIGS. 1 and 3, the solenoid valves 56B and 56C are arranged in parallel with the solenoid valve 56A within the common housing body 50A and connected at their inlet ports to the hydraulic circuit $B_6$ and at their exhaust ports to the exhaust circuit $B_8$. In such arrangement, the solenoid valves 56B and 56C are respectively provided at their inlet ports with replaceable orifice elements $O_3$ and $O_4$. Construction of remaining portions of the respective solenoid valves 56B and 56C is substantially the same as that of the solenoid valve 56A.

As shown in FIG. 6, the cut-off valve 57A is associated with the bypass valve 58A coaxially within a common cylinder bore 50*d* which is formed in the housing body 50A and closed by a closure plug 50D fastened in place by a nut 50E with a hexagon socket. The cut-off valve 57A comprises a valve seat member 57*a* fixedly coupled within the cylinder bore 50*d* through an annular seal member 57*b* to form a valve chamber 57*c*, a ball valve 57*d* contained within the valve chamber 57*c*, and a piston 57*f* axially slidably disposed within the cylinder bore 50*d* to form a braking pressure chamber 57*g* and a power pressure chamber 57*h*. The piston 57*f* is provided in its outer circumference with a pair of axially spaced annular cup seal members 57*i* and 57*j*.

The bypass valve 58A comprises a valve seat member 58*a* fixedly coupled within the cylinder bore 50*d* through an annular seal member 58*b* and fitted to the valve seat member 57*a* to form a valve chamber 58*e*, a ball valve 58*f* contained within the valve chamber 58*e*, a tubular valve seat member 58*c* fixedly coupled within the valve seat members 57*a* and 58*a* through a pair of axially spaced annular seal members 58*d*, 58*d* to form a bypass passage, a compression coil spring 57*e* contained within the tubular valve seat member 58*c* and being engaged at the opposite ends thereof with the ball valves 57*d* and 58*f*, and a piston 58*g* axially slidably disposed within a counter bore in the closure plug 50D through a pair of axially spaced annular seal members 58$j$, 58$j$ to form a braking pressure chamber 58$h$ and a power pressure chamber 58$i$. In the assembly of cut-off valve 57A and bypass valve 58A, the valve chamber 57$c$ is connected to a first part $B_{1a}$ of the hydraulic circuit $B_1$ in connection to the master cylinder 12, the valve chamber 58$e$ is connected to a second part $B_{1b}$ of the hydraulic circuit $B_1$ in connection to the wheel brake cylinder 21, and the power pressure chamber 58$i$ is connected to the hydraulic circuit $B_5$ through a port 50$e$.

In operation, the power pressure chamber 57$h$ of cut-off valve 57A is applied with the power pressure from the two-stage pump 52 by way of the check valve 54, orifice element $O_1$, regulator valve 55, orifice element $O_2$ and solenoid valve 56A. Thus, the piston 57$f$ is urged rightward to disengage the ball valve 57$d$ from a seat portion of member 57$a$, while the piston 58$g$ is urged leftward by the power pressure applied thereto in chamber 58$i$ to engage the ball valve 58$f$ with a seat portion of the tubular seat member 58$c$ against the compression coil spring 57$e$. Under such a condition, the valve chamber 57$c$ is communicated with the valve chamber 58$e$ through the braking pressure chamber 57$g$, axial holes in valve seat members 57$a$ and 58$a$, and braking pressure chamber 58$h$ to permit the flow of pressurized fluid between the first and second parts of the hydraulic circuit $B_1$, and the piston 57$f$ is maintained in engagement with the left end of valve seat member 57$a$ to minimize the capacity of braking pressure chamber 57$g$.

When the solenoid valve 56A is energized to connect the power pressure chamber 57$h$ to the fluid reservoir 51 therethrough, the piston 57$f$ is moved leftward by the hydraulic braking pressure applied thereto in chamber 57$g$, and in turn, the ball valve 57$d$ engages the seat portion of member 57$a$ to block communication between the valve chamber 57$c$ and the braking pressure chamber 57$g$. Thus, the first part $B_{1a}$ of hydraulic circuit $B_1$ is disconnected from the second part $B_{1b}$ of hydraulic circuit $B_1$, and subsequently the capacity of braking pressure chamber 57$g$ is increased by the leftward movement of piston 57$f$ to decrease the braking pressure applied to the wheel brake cylinder 21.

If the power pressure drops below a predetermined value due to damage of the pump 52, motor 53, hydraulic circuit $B_5$ or the like, the piston 58$g$ of bypass valve 58A will have applied thereto the braking pressure through the chamber 57$g$ of cut-off valve 57A prior to engagement of the ball valve 57$d$ with the seat portion of member 57$a$. Thus, the piston 58$g$ will be moved rightward by the difference in pressure between chambers 58$h$ and 58$i$ so that the ball valve 58$f$ is disengaged from the seat portion of tubular seat member 58$c$ to permit a bypass flow of pressurized fluid across the tubular seat member 58$c$ between the valve chambers 57$c$ and 58$e$. In such a condition, the ball valve 58$f$ is engaged with a seat portion of member 58$a$ to block a reverse flow of the pressurized fluid from the valve chamber 58$e$ to the braking pressure chamber 58$h$.

As shown in FIG. 3, the cut-off valves 57B, 57C and 57D are arranged in parallel with the cut-off valve 57A within the common housing body 50A and associated with the bypass valves 58B, 58C and 58D respectively in the same manner as described above. The construction and function of the cut-off valves 57B, 57C and 57D are substantially the same as those of the cut-off valve 57A, and also the construction and function of the bypass valves 58B, 58C and 58D are substantially the same as those of the bypass valve 58A. (see FIG. 1)

The computer 40 is responsive to the electric signals from the wheel lock sensors 31, 32, 33 and 34 to detect rotation of the respective road wheels in braking operation. In this embodiment, the computer 40 is further arranged to energize the electric motor 53 in response to depression of the brake pedal 10 so as to activate the two-stage pump 52 only in braking operation. Assuming that the left-hand front road wheel tends to be locked in the braking operation, the solenoid valve 56A is energized by an electric control signal from the computer 40 to exhaust the power pressure from the chamber 57$h$ of cut-off valve 57A into the fluid reservoir 51. Thus, the cut-off valve 57A acts to block the communication between the first and second parts of hydraulic circuit $B_1$ and to decrease the braking pressure in the wheel brake cylinder 21. When the road wheel is released from the tendency to be locked, the solenoid valve 56A is deenergized under control of the computer 40 such that the chamber 57$h$ of cut-off valve 57A is applied with the hydraulic power pressure through the solenoid valve 56A to permit the flow of pressurized fluid between the first and second parts of hydraulic circuit $B_1$ thereby to increase the braking pressure in the wheel brake cylinder 21. Subsequently, the solenoid valve 56A is alternatively energized and deenergized under control of the computer 40 to control the braking pressure in the wheel brake cylinder 2 so as to prevent the road wheel from locking during braking.

Assuming that the above-described braking operation has been conducted prior to activation of the pump 52, the booster piston assembly in regulator valve 55 is moved leftward against the load of spring 55$c$ by the hydraulic braking pressure applied to the chamber 55$f$ through the hydraulic circuit $B_7$. Thus, the regulator valve 55 acts to cooperate with the check valve 54 in response to leftward movement of the booster piston assembly thereby to produce a hydraulic pressure in power pressure chamber 55$e$ at a higher value than the braking pressure. As a result, at the initial stage of the braking operation, the piston 57$f$ of cut-off valve 57A and the piston 58$g$ of bypass valve 58A are maintained in their initial positions by the hydraulic pressure applied thereto from the power pressure chamber 55$e$ of regulator valve 55. This means that even when the pump 52 is activated in response to depression of the brake pedal 10 under control of the computer 40 to produce the hydraulic power pressure prior to energization of the solenoid valves 56A–56C, the cut-off valves 57A–57D and the bypass valves 58A–58D are conditioned to effect normal control of the braking pressure applied to the wheel brake cylinders 21–24. For this reason, it is able to eliminate unnecessary activation of the pump 52 during travel of the vehicle.

It is further noted that when the solenoid valve 56A has been deenergized to permit the hydraulic power pressure applied therethrough to the chamber 57$h$ to cut-off valve 57A, the orifice element $O_2$ acts to throttle the flow of pressurized fluid supplied therethrough into the chamber 57$h$ of cut-off valve 57A from the chamber 55$e$ of regulator valve 55 so as to restrain pressure drop in the hydraulic circuit $B_6$, and subsequently the orifice element $O_1$ acts to throttle the flow of pressurized fluid supplied therethrough into the chamber 55$e$ of regulator valve 55 from the pump 52 so as to the occurrence of a pressure drop in the hydraulic circuit $B_5$. This is effective to restrain pressure pulsation in the regulator valve 55 and master cylinder 12 and to maintain the hydraulic power pressure acting on the piston 58g of bypass valve 58A. Furthermore, the orifice elements $O_1$ and $O_2$ are useful to restrain pressure pulsation transmitted from the pump 52 to the booster piston assembly in regulator valve 55 and the piston 57f in cut-off valve 57A thereby to enhance durability of sealing members for the piston assemblies. Assuming that all the solenoid valves 56A–56C are deenergized to permit the hydraulic power pressure applied therethrough to the cut-off valves 57A–57D, a large amount of pressurized fluid is supplied into the cut-off valves 57A–57D from the chamber 55e of regulator valve 55. In such a situation, the orifice elements $O_2$, $O_3$ and $O_4$ act to restrain a pressure drop in the hydraulic circuit $B_5$, and subsequently the orifice element $O_1$ acts to maintain the hydraulic power pressure acting on the pistons 58g in bypass valves 58A–58D.

Figure 7:
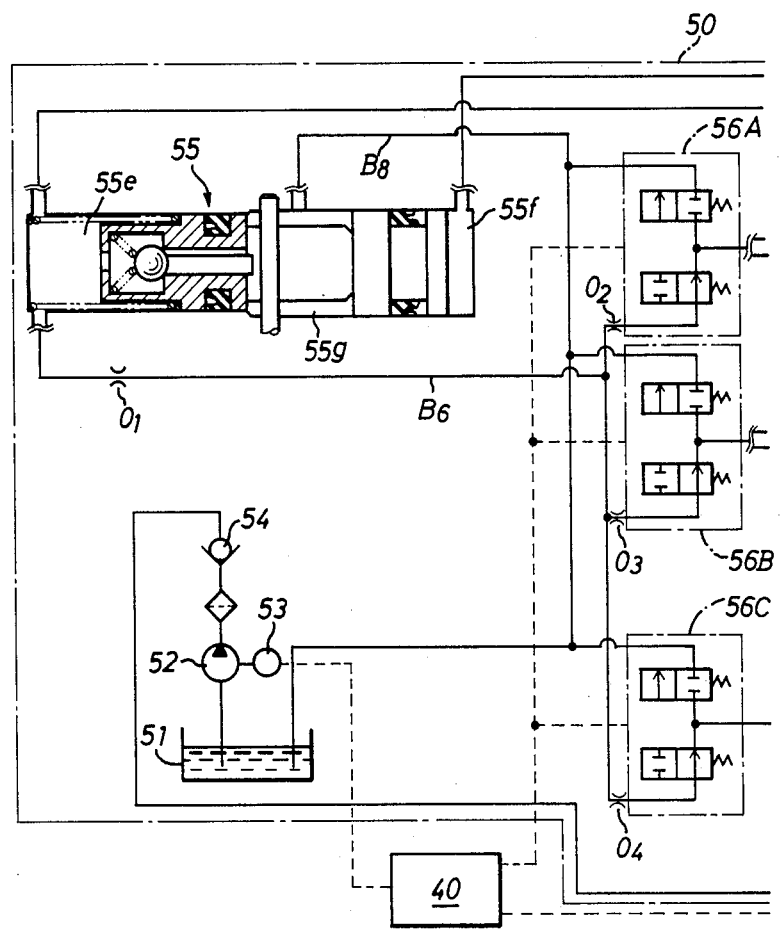
FIG. 7 is a partial schematic illustration of another embodiment of the present invention.

In a modification of the hydraulic anti-skid apparatus, the orifice element $O_1$ may be disposed within the hydraulic circuit $B_6$ between the regulator valve 55 and the orifice elements $O_2$, $O_3$ and $O_4$, as shown in FIG. 7. In this modification, the orifice element $O_1$ is formed so as to be larger in diameter than the orifice elements $O_2$–$O_4$. In actual practice, it is advantageous that the orifice elements $O_2$–$O_4$ can be replaced with another orifice elements in a simple manner when the anti-skid apparatus is adapted to another automotive vehicle.

Having now fully set forth both the structure and operation of certain preferred embodiments of the concept underlying the present invention, various other embodiments as well as certain variations and modifications of the embodiments herein shown and described will obviously occur to those skilled in the art upon becoming familiar with said underlying concept. It is to be understood, therefore, that within the scope of the appended claims, the invention may be practiced otherwise than as specifically set forth herein.

What is claimed is:

1. A hydraulic anti-skid apparatus for installation in a vehicle braking system between a master cylinder and a wheel brake cylinder, comprising:
   a fluid reservoir arranged to store an amount of hydraulic fluid;
   a fluid pump connected to said reservoir to produce a hydraulic power pressure;
   a cut-off valve disposed within a braking circuit connecting said master cylinder to said wheel brake cylinder;
   a bypass valve disposed within a bypass passage of the braking circuit;
   first and second pistons respectively arranged to control opening and closing operations of said cut-off valve and said bypass valve, said first and second pistons each being arranged to be applied at one end thereof with a hydraulic braking pressure from said master cylinder and at the other end thereof with the hydraulic power pressure from said fluid pump;
   a changeover valve arranged to be activated when a road wheel of the vehicle tends to be locked in braking operation, said changeover valve being adapted to apply the hydraulic power pressure to said first piston in its deactivated condition and to connect said first piston to said fluid reservoir in its activated condition; and
   a regulator valve arranged to control the hydraulic power pressure applied to said first and second pistons in accordance with the hydraulic braking pressure applied thereto from said master cylinder;
   wherein said regulator valve comprises a booster piston assembly having a small diameter portion applied with the hydraulic power pressure from said fluid pump and a large diameter portion applied with the hydraulic braking pressure from said master cylinder, and an exhaust valve assembled with said booster piston assembly to connect the small diameter portion of said booster piston assembly to said fluid reservoir when the hydraulic power pressure exceeds a predetermined value higher than the hydraulic braking pressure, wherein a check valve is arranged between said fluid pump and said regulator valve to permit the flow of pressurized fluid supplied from said fluid pump to said regulator valve and to block the flow of pressurized fluid from said regulator valve to said fluid pump so that the booster piston assembly of said regulator valve cooperates with said check valve to produce a hydraulic pressure at a higher value than the braking pressure, and wherein flow restriction means is arranged to throttle the flow of pressurized fluid supplied to said first piston through said regulator valve and said changeover valve so as to maintain the hydraulic power pressure acting on said second piston.

2. A hydraulic anti-skid apparatus as claimed in claim 1, wherein said flow restriction means comprises an orifice element arranged between said fluid pump and said regulator valve to throttle the flow of pressurized fluid supplied to the booster piston assembly of said regulator valve.

3. A hydraulic anti-skid apparatus as claimed in claim 1, wherein said flow restriction means comprises an orifice element assembled with said changeover valve to throttle the flow of pressurized fluid supplied to said first piston through said changeover valve.

4. A hydraulic anti-skid apparatus as claimed in claim 1, wherein said flow restriction means comprises a first orifice element arranged between said fluid pump and said regulator valve to throttle the flow of pressurized fluid supplied to the booster piston assembly of said regulator valve, and a second orifice element assembled with said changeover valve to throttle the flow of pressurized fluid supplied to said first piston through said changeover valve.

5. A hydraulic anti-skid apparatus as claimed in claim 1, wherein said flow restriction means includes a first orifice element disposed within a hydraulic circuit between said regulator valve and said changeover valve to throttle the flow of pressurized fluid supplied to said changeover valve from said regulator valve, and a second orifice element assembled with said changeover valve to throttle the flow of pressurized fluid supplied to said first piston through said changeover valve.

6. A hydraulic anti-skid apparatus as claimed in claim 5, wherein said second orifice element is replaceably assembled with said changeover valve.

7. A hydraulic anti-skid apparatus as claimed in claim 5, wherein said first orifice element is formed with a diameter larger than that of said second orifice element.

8. A hydraulic anti-skid apparatus as claimed in claim 1, wherein said fluid pump is arranged to be driven by an electric motor in response to actuation of said master cylinder.

9. A hydraulic anti-skid apparatus as claimed in claim 1, wherein said flow restriction means comprises an orifice element arranged between said regulator valve and said changeover valve to throttle the flow of pressurized fluid supplied to said first piston through said changeover valve.

10. A hydraulic anti-skid apparatus as claimed in claim 1, wherein said flow restriction means includes a first orifice element arranged between said fluid pump and said regulator valve to throttle the flow of pressurized fluid supplied to the booster piston assembly of said regulator valve, and a second orifice element arranged between said regulator valve and said changeover valve to throttle the flow of pressurized fluid supplied to said first piston through said changeover valve.

11. A hydraulic anti-skid apparatus as claimed in claim 3, wherein said orifice element is replaceably assembled with said changeover valve.

12. A hydraulic anti-skid apparatus as claimed in claim 1, wherein said flow restriction means includes a first orifice element disposed with a hydraulic circuit between said regulator valve and said changeover valve to throttle the flow of pressurized fluid supplied to said changeover valve from said regulator valve, and a second orifice element arranged between said first orifice element and said changeover valve to throttle the flow of pressurized fluid supplied to said first piston through said changeover valve.

13. A hydraulic anti-skid apparatus for installation in a vehicle braking system between a master cylinder and a plurality of wheel brake cylinders, comprising:
a fluid reservoir arranged to store an amount of hydraulic fluid;
a fluid pump connected to said reservoir to produce a hydraulic power pressure;
a plurality of cut-off valves each disposed within a braking circuit connecting said master cylinder to each of said wheel brake cylinders;
a plurality of bypass valves each disposed within each bypass passage of said braking circuits;
first and second pistons respectively arranged to control opening and closing operations of each of said cut-off valves and each of said bypass valves, said first and second pistons each being arranged to be applied at one end thereof with a hydraulic braking pressure from said master cylinder and at the other end thereof with the hydraulic power pressure from said fluid pump;
a plurality of changeover valves each arranged to be activated when a road wheel of the vehicle tends to be locked in braking operation, said changeover valves each being adapted to apply the hydraulic power pressure to said first piston in its deactivated condition and to connect said first piston to said fluid reservoir in its activated condition; and
a regulator valve arranged to control the hydraulic power pressure applied to said first and second pistons in accordance with the hydraulic braking pressure applied thereto from said master cylinder;
wherein said regulator valve comprises a booster piston assembly having a small diameter portion applied with the hydraulic power pressure from said fluid pump and a large diameter portion applied with the hydraulic braking pressure from said master cylinder, an exhaust valve assembled with said booster piston assembly to connect the small diameter portion of said booster piston assembly to said fluid reservoir when the hydraulic power pressure exceeds a predetermined value higher than the hydraulic braking pressure;
wherein a check valve is arranged between said fluid pump and said regulator valve to permit the flow of pressurized fluid supplied from said fluid pump to said regulator valve and to block the flow of pressurized fluid from said regulator valve to said fluid pump so that the booster piston assembly of said regulator valve cooperates with said check valve to produce a hydraulic pressure at a higher valve than the braking pressure; and
wherein a first orifice element disposed within a hydraulic circuit between said regulator valve and said changeover valves to throttle the flow of pressurized fluid supplied to said changeover valves from said regulator valve, and a plurality of second orifice elements each arranged between said first orifice element and each of said changeover valves to throttle the flow of pressurized fluid supplied to said first piston through each of said changeover valves.

* * * * *

UNITED STATES PATENT AND TRADEMARK OFFICE
CERTIFICATE OF CORRECTION

PATENT NO. : 4,655,509

DATED : April 7, 1987

INVENTOR(S) : Masamoto Ando, et al

It is certified that error appears in the above-identified patent and that said Letters Patent is hereby corrected as shown below:

```
The first word on the second line of item [73]
is misspelled.
Should read as follows:

= Toyota =
```

Signed and Sealed this

Third Day of November, 1987

Attest:

DONALD J. QUIGG

Attesting Officer

Commissioner of Patents and Trademarks